United States Patent
Kolander

(10) Patent No.: US 7,158,854 B1
(45) Date of Patent: Jan. 2, 2007

(54) UNIVERSAL MOLD VACUUM SYSTEM

(75) Inventor: Steven P. Kolander, West Allis, WI (US)

(73) Assignee: MGS Mfg. Group, Inc., Germantown, WI (US)

( * ) Notice: Subject to any disclaimer, the term of this patent is extended or adjusted under 35 U.S.C. 154(b) by 0 days.

(21) Appl. No.: 11/185,631

(22) Filed: Jul. 20, 2005

(51) Int. Cl.
*B29C 45/00* (2006.01)

(52) U.S. Cl. .................. 700/200; 700/197; 700/201; 700/204

(58) Field of Classification Search .......... 700/197, 700/200, 201, 203, 204; 264/328.8, 328.9, 264/328.11; 425/562, 577
See application file for complete search history.

(56) References Cited

U.S. PATENT DOCUMENTS

| | | | |
|---|---|---|---|
| 6,108,587 A * | 8/2000 | Shearer et al. .............. | 700/200 |
| 6,367,765 B1 * | 4/2002 | Wieder ......................... | 425/546 |
| 6,645,417 B1 * | 11/2003 | Grove ...................... | 264/328.8 |
| 6,684,264 B1 * | 1/2004 | Choi ........................... | 700/201 |
| 7,013,196 B1 * | 3/2006 | Magario et al. ............. | 700/197 |
| 2004/0093114 A1 * | 5/2004 | Magario et al. ............. | 700/197 |

* cited by examiner

*Primary Examiner*—Albert W. Paladini
*Assistant Examiner*—Charles Kasenge
(74) *Attorney, Agent, or Firm*—Boyle Fredrickson Newholm Stein & Gratz S.C.

(57) ABSTRACT

A controller for a mold vacuum unit uses a programmable logic controller to provide flexible translation of pre-existing signals present on the injection-molding machine avoiding the need for modification of that machine by the addition of limit switches or the like. Simple adjustment of real time of time delays is provided by the integration of two self-contained timer units working in conjunction with the fixed programming of the programmable logic controller. Removable memories for the programmable logic controller allow the vacuum unit to be used with a variety of different injection-molding machines.

13 Claims, 2 Drawing Sheets

UNIVERSAL MOLD VACUUM SYSTEM

BACKGROUND OF THE INVENTION

The present invention relates to injection molding machines and in particular to vacuum systems for such injection-molding machines.

Injection-molding injects heated thermoplastic material at high pressures from an injector into a mold. The thermoplastic material cools within the mold and the mold may be opened and the part ejected.

Gas trapped in the mold during the injection process may escape through the mold seams or through vents provided for that purpose. Alternatively, it is well known to apply a vacuum to the mold during the injection process to reduce gas entrapment. U.S. Pat. No. 4,573,900 entitled: *Evacuation System for Injection-molding Machines*, hereby incorporated by reference, describes a timer system controlling a pneumatic vacuum pump that may be used first, to apply a vacuum to the mold during certain periods of the injection cycle and second, to apply a positive pressure from the pneumatic line to the mold creating a "blow back" to assist in part ejection.

Standard machines normally employ proprietary control systems that do not provide control signals to activate the vacuum system at the proper time and duration. Accordingly, it is known in the art to attach mechanical limit switches to the mold and its associated clamping mechanism to create the necessary signals from mechanical movement of the mold elements.

This approach may not be suitable for creating more sophisticated vacuum control signals triggered by events or states not associated with a change in mold position, for example, as may occur in some two-shot molding applications. Modification of the standard injection-molding machine to attach the limit switches not envisioned by the manufacturer can be difficult and the limit switches, once in place, are subject to damage and contamination.

BRIEF SUMMARY OF THE INVENTION

The present invention provides a mold vacuum system that employs a programmable logic controller to translate pre-existing control signals used or created by the standard injection-molding machine into the necessary vacuum control signals. In one important application, the programmable logic controller receives signals from the interface on the standard injection-molding machine used for coordination of the injection-molding machine with robotic or automated parts handling system. This interface provides some standardization and documentation.

The programmable logic controller may be flexibly programmed for complex logical combinations of existing signals to eliminate the need for special limit switches. Further, replaceable memory cartridges for the programmable logic controller allow ready transfer of the mold vacuum system among machines by switching the memory as a "personality module".

In one embodiment, the programmable logic controller may work with standard electronic timers, the latter which provide a simple and familiar method of varying timing parameters in real-time without the drawbacks of connecting a programming terminal to the programmable logic controller.

Specifically then, the present invention provides a vacuum system for a standard injection-molding machine having an injector unit, a mold clamp unit, and an injection-molding controller producing control signals controlling the injector unit and mold clamp unit. The vacuum system includes an interface cable connectable to the control signals of the injection-molding controller and a programmable logic controller receiving the control signals from the interface cable and executing a stored program to derive vacuum timing signals from at least some of the control signals. A vacuum pump and valve assembly receives vacuum timing signals from the programmable logic controller to provide vacuum on a vacuum line to a mold.

It is thus one object of at least one embodiment of the invention to provide a control of a vacuum system without the need to install mechanical limit switches or otherwise modify the injection-molding machine. It is another object of at least one embodiment of the invention to allow arithmetic and logical combinations of standard injection-molding controller signals to provide more sophisticated vacuum control.

The vacuum system may include at least one electronic timer having an integral programming panel, the electronic timer communicating with the programmable logic controller to provide a timing function for the vacuum timing signal.

It is thus another object of at least one embodiment of the invention to incorporate standalone timers into the vacuum system, despite the presence of timing functions within the programmable logic controller, to provide a familiar interface to the user that allows simple, real-time modification of the operation of the vacuum system without a programming terminal.

The programmable logic controller may provide the vacuum timing signal to the electronic timer where it is delayed and then passed to the vacuum pump and valve assembly.

It is thus another object of at least one embodiment of the invention to provide an interface between the timers and the programmable logic controller that does not require communication of a timing value to the programmable logic controller.

The timing function may be the duration of the application and vacuum to the mold.

Thus it is another object to the invention to provide ready accessibility to a parameter that typically must be adjusted for a given mold while employing the programmable logic controller to handle parameters that vary only among injection-molding machines.

The vacuum system may include a terminal block receiving the interface cable and providing terminals releasably holding wires communicating with the programmable logic controller and the timer.

It is thus another object of at least one embodiment of the invention to allow highly flexible interconnection among the control signals, the programmable logic controller and the timers.

The programmable logic controller may execute the stored program to create a control signal communicated to the injection-molding machine causing the injection-molding controller to suspend cycling of the injection-molding machine.

It is thus another object of at least one embodiment of the invention to provide new functionality to a vacuum system by allowing the vacuum system to control the injection-molding system in complex vacuum applications.

The vacuum system may include a pressure sensor and the programmable logic controller may receive a pressure sensor signal to create the vacuum timing signal.

It is thus another object of at least one embodiment of the invention to provide sophisticated control of vacuum levels.

The programmable logic controller may execute the stored program to provide pump control signals to the vacuum pump and valve assembly stopping the pump when vacuum will not be required for a predetermined period of time.

It is thus another object of at least one embodiment of the invention to provide a more efficient mold vacuum system that reduces part wear and energy consumption.

The control lines of the injection-molding controller may be electrical inputs or outputs providing standard signals to automatic parts handling machines.

It is thus another object of at least one embodiment of the invention to make use of a standard interface signals intended for robotic or automated part handling to control the vacuum system on injection-molding machines having proprietary control systems.

The programmable logic controller may include a removable memory, and the vacuum system may include multiple removable memories storing programs associated with control signals of different standard injection-molding machines.

It is thus another object of at least one embodiment of the invention to allow the mold vacuum system to be quickly moved between injection-molding machines by simply swapping personality modules.

The vacuum system may include an input receiving compressed air and a compressed air valve assembly communicating with the vacuum line. The programmable logic controller may further execute the stored program to create blowback timing signals from at least some of the control signals to the compressed air valve to provide compressed air to the mold.

It is thus another object of at least one embodiment of the invention to provide blowback features as well as vacuum line features.

These particular objects and advantages may apply to only some embodiments falling within the claims, and thus do not define the scope of the invention.

DETAILED DESCRIPTION OF THE PREFERRED EMBODIMENT

Figure 1:
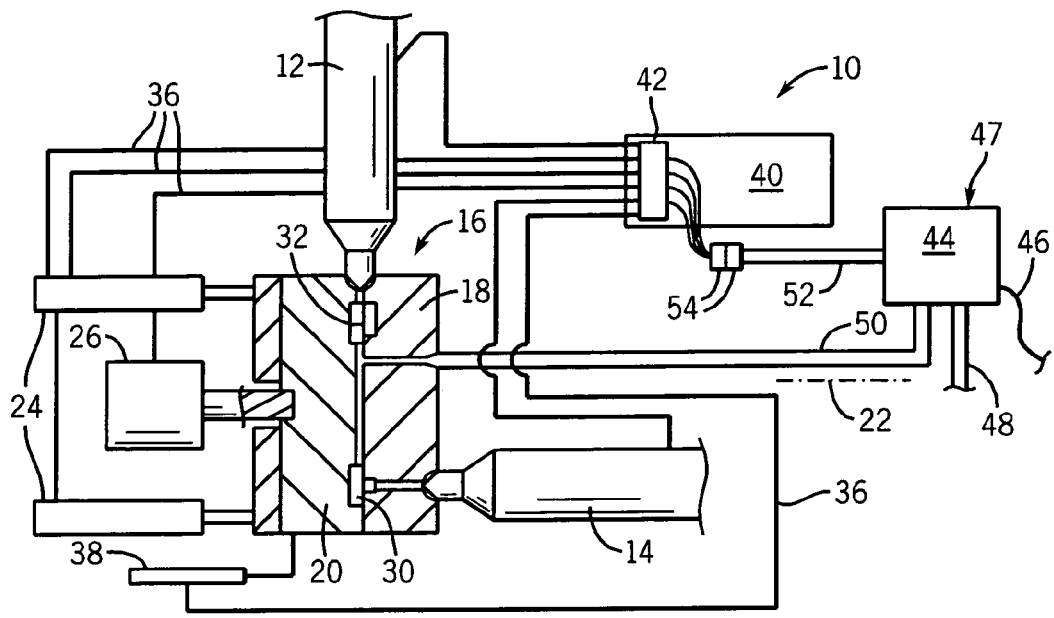
FIG. 1 is a simplified schematic of an injection-molding machine for two shot injection showing the injector units, the mold clamp unit, the injection-molding controller, and the vacuum system of the present invention.

Referring now to FIG. 1, an injection-molding machine 10 for two shot molding includes a first injector 12 and second injector 14 for delivering two different thermoplastic materials to the mold 16.

The mold 16 includes a stationery mold portion 18 and a movable mold portion 20 that together define cavities 30 and 32. The movable mold portion 20 may be separated along a mold separation axis 22 to pull away from stationary mold portion 18 for the ejection of parts. This motion may be accomplished by hydraulic actuators 24 providing a mold clamping and opening according to methods known in the art.

For two shot molding, a hydraulic motor 26 may rotate the movable mold portion 20 about axis 22 to carry a molded part (not shown) produced in a cavity 30 after receiving material from injector 14 to a cavity 32. At cavity 32, the molded part may receive additional material from injector 12.

Generally, injectors 12 and 14 may communicate via runners all or partially within the stationary mold portion 18 with the injector 14 directed along the axis 22 and the injector 12 perpendicular to that axis near the part line between mold portions 18 and 20.

Control lines 36 may pass from each of the injectors 14, 12, the actuators 24, the motor 26, and other sensors 38 (for example, a mold position sensor) to an injection-molding controller 40. The injection-molding controller 40 may be a proprietary electrical circuit or a programmable logic controller with a proprietary program written to synchronize operation of the various components.

The injection-molding controller 40 may have a terminal block 42 at which these control signals, including inputs to the controller 40 and outputs from the controller 40, may be accessed. Generally, the control signals at terminal block 42 may include non-proprietary signals intended to assist coordinating the injection-molding machine 10 with automatic handling equipment (not shown).

The injection-molding machine 10 may be provided with a vacuum system 44 typically added after purchase of the injection-molding machine 10. The vacuum system 44 may receive electrical power 46 and a source of compressed air 48 from external sources and provides a "vacuum" line 50 that may provide either a vacuum or pressurized air therein. The vacuum line 50 communicates with the stationary mold portion 18 and channels within the mold portion 18 that may provide a path of gases out of the mold cavities 32 and 30.

The vacuum system 44 provides an interface cable 52 that connects via a releasable connector 54 with the selective control signals of the terminal block 42 that may be prewired to a separable half of the releasable connector so that the vacuum system 44 may be easily moved among injection-molding machines 10.

Figure 2:
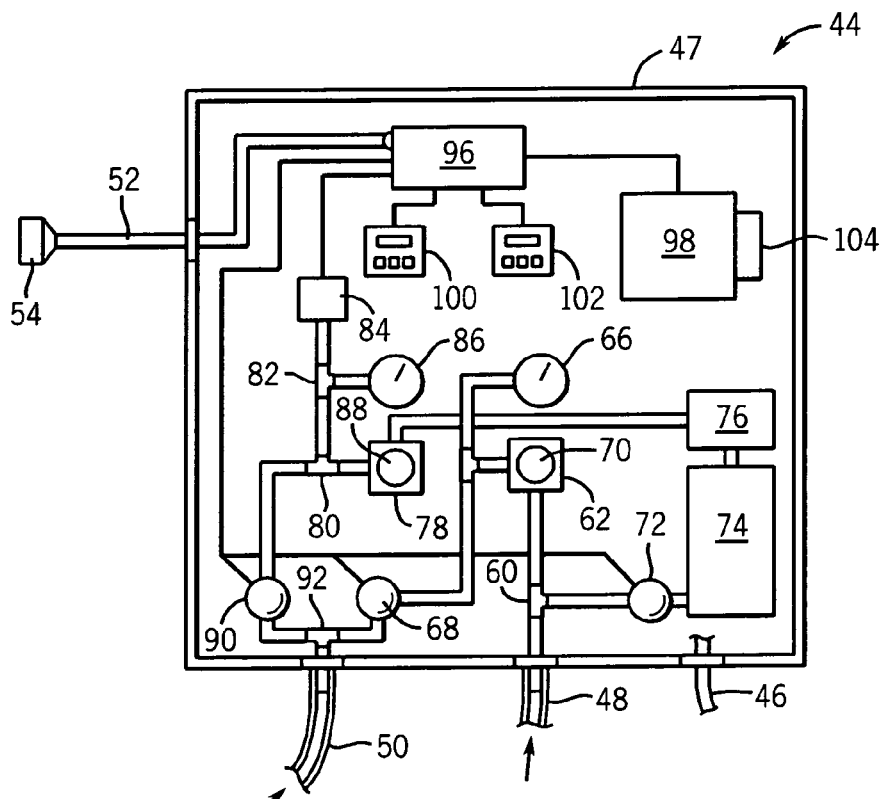
FIG. 2 is a detailed block diagram of the vacuum system of FIG. 1 showing the use of a terminal block to manage interconnection of a programmable logic controller having removable memory to timers, valves, regulators, vacuum pumps, and accumulators of the vacuum system.

Referring now to FIG. 2, the vacuum system 44 has a housing 47 with fittings receiving the source of compressed air 48 and the interface cable 52 and providing an outlet for the vacuum line 50. Inside the housing 47, the line from the source of compressed air 48 may pass to a tee 60 where it branches to a first pressure regulator 62 of a type well known in the art and second to a solenoid valve 72. The outlet of the pressure regulator 62 passes to a second tee 64. The second tee 64 is joined with a pressure gauge 66 and a solenoid valve 68.

The outlet of the solenoid valve 72 is received by a pneumatically operated vacuum pump 74 so that when the pump 74 receives pressurized air through valve 72, a vacuum is created and passed to accumulator 76 and then to vacuum regulator 78. The vacuum regulator 78 provides regulated vacuum to a tee 80, a first branch of which goes to a second tee 82 branching to a vacuum sensor 84 providing an electrical signal and a gauge 86 as will be understood in the art. The remaining branch of tee 80 provides vacuum to a third solenoid valve 90.

The solenoid valves 90 and 68 are joined through tee 92 to the vacuum line 50.

Generally, solenoid valve 72 may thus be used to electrically control turning on and off the vacuum pump 74 whereas the solenoid valves 90 and 68 may alternatively apply either a vacuum or a regulated pressure through tee 92 to the vacuum line 50.

A knob 70 of the pressure regulator 62 and a knob 88 of the regulator 78 as well as the pressure gauges 66 and 86 are accessible during use of the vacuum system 44 through apertures in a front panel of the housing 47.

Also included within the housing 47 are timers 100 and 102 such as are commercially available from Potter & Brumfield under the "CNT Series" trade name. Timers of this type are freestanding electronic modules including typically an internal microprocessor for reading front panel switch inputs (for count, time value, or mode of operation) and producing a displayed output and executing contained firmware to control a the set of contacts for generating an output signal based on the switch settings and input trigger signals.

Finally, the housing 47 holds a compact programmable logic controller 98, for example, as are commercially available from Mitsubishi under the FX trade name. As will be understood to those of ordinary skill in the art, a compact programmable logic controller is an industrial computer programmable with a specialized programming language, for example, relay ladder logic language, to allowing inputs to produce outputs, both via self-contained input/output (I/O) terminals, using Boolean and arithmetic instructions and simple timer and counter functions.

The programming of a compact programmable logic controller 98 normally requires connection to an external programming terminal such as a personal computer. In the preferred embodiment, the programmable logic controller 98 may include a removable memory stick 104 onto which data and/or programs developed on the external programming terminal may be retained so that reprogramming of the programmable logic controller 98 may be performed by simply changing the memory stick 104.

Referring still to FIG. 2 inside the housing 47, the control signals of the injection-molding machine 10 from interface cable 52 are received by a terminal block 96 of conventional design. Terminal block 96 allows these signals to be flexibly connected to I/O terminals of the programmable logic controller 98 corresponding terminals of a first timer 100 or second timer 102, and/or for signals to be passed between the programmable logic controller 98 and the timers 100 and 102.

In normal use, control signals from the controller 40 of the injection-molding machine 10 will be provided from interface cable 52 directly to the programmable logic controller 98 and signals from the programmable logic controller 98 will be provided to one or both of the timers 100 and 102. Generally, the signals on interface cable 52 will be signals from the controller 40 effecting a common interface with material handling equipment, however, these signals may also be obtained from other input and outputs to and from the controller 40 depending on the availability of documentation and the knowledge of the installer.

Figure 3:
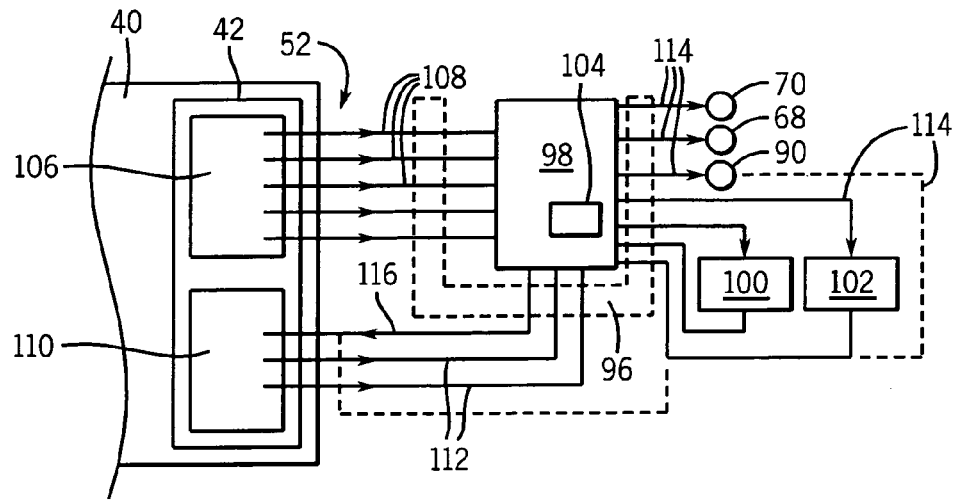
FIG. 3 is a simplified wiring diagram of a connection of the vacuum system of FIG. 2 to control signals of the electronic injection-molding controller of FIG. 1 showing the receipt of the signals to create various vacuum control signals and the creation of signals returning to the injection-molding controller to modify the injection cycle.

Referring now to FIGS. 2 and 3 during operation, the programmable logic controller 98 may be connected via the terminal block 96 to controller output signals 108 generated by the controller 40 and exposed at output terminals 106 of terminal block 42 of the controller 40. These controller output signals 108, for example, provide signals controlling the injectors and hydraulic systems of the injection-molding machine 10. The controller output signals 108 may be combined with controller input signals 112 from input terminals 110, for example, being from sensors on the injection-molding machine 10 and received at I/O terminals of the programmable logic controller 98 to be used as inputs thereto.

The programmable logic controller 98 logically combines signals from controller output signals 108 and from controller input signals 112 according to its stored program on memory stick 104, using user selected logic and arithmetic instructions and state dependent counter and timer functions to produce vacuum control signals 114. The vacuum control signals 114 pass through terminal block 96 to valves 72, 68, 90 to control those and to the timers 100 and 102 to trigger the timers and to produce timer output signals that may be provided to the programmable logic controller 98 or directly to the valves 72, 68, 90 as additional vacuum control signals 114.

In addition, the programmable logic controller 98 may produce an output signal 116 forming one of the controller input signals 112 that may be received by the input terminals 110 of the terminal block 42 of controller 40 to provide control signals to the controller 40, for example, stalling the injection cycle of the injection-molding controller 40 until the output signal 116 is released by the programmable logic controller 98.

Figure 4:
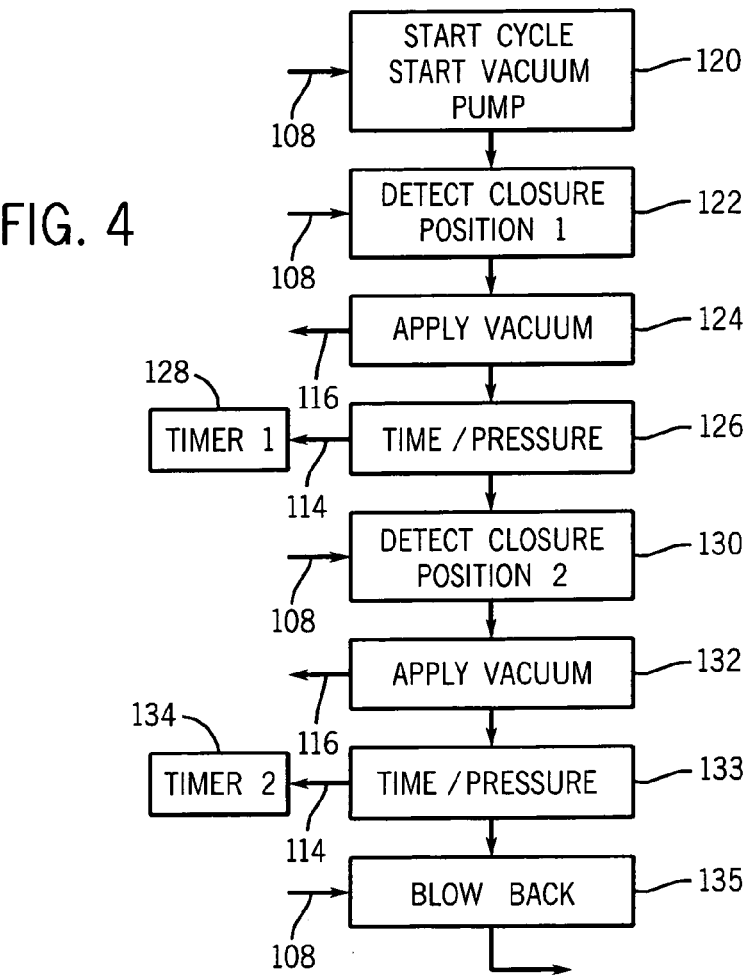
FIG. 4 is a flow chart of an example program executed by the programmable logic controller of FIG. 2 to generate vacuum control signals for a two shot injection-molding process on the machine of FIG. 1.

Referring now to FIGS. 3 and 4, a program executed by the programmable logic controller 98 may begin, as indicated by process block 120, by detecting a start of an injection cycle, for example, by decoding one or more signals from the controller 40 depending on the proprietary protocols of the controller 40. The particular control signals and their combination used to produce the vacuum signals will depend on the machine and protocol.

At this detection, the programmable logic controller 98 may activate valve 72 to begin charging of the accumulator 76 through operation of the vacuum pump 74.

As indicated by process block 122, closure of the mold portions 20 and 18 may be deduced from other control signals from interface cable 52, for example, actual sensor 38 signals, the ceasing of injector screw rotation, or the like.

In one embodiment, the programmable logic controller 98 may then open valve 68 and produce a stall signal stalling the controller 40 until a sufficient vacuum level is reached within the mold 16 as indicated by process block 124. Once that level is reached per process block 126, the controller 40 is released and injection may begin. At this time, the programmable logic controller 98 may strobe the timer 100 to provide a timing signal (per process block 128) to the programmable logic controller 98 when vacuum should be released. This timing signal may be readily changed by an operator observing the injection-molding process by access to the front panel switches of the timer 100. The timer 100 or the programmable logic controller 98 may control valve 90 to cut off the vacuum.

Process blocks 130–134 may then repeat the processes of process blocks 122–128 for the second shot of plastic, but this time using a second timer 102 during process block 134 and possibly a different vacuum pressure in process block 130, variations made possible by the internal logic of the programmable logic controller 98 which may easily deduce different shot numbers from similar mold closure signals.

At process block 135, detecting an end of the injection cycle may be performed by decoding one or more signals from the controller 40 to initiate a blow back where valve 68 is opened for a time controlled by an internal timer of the programmable logic controller 98. The process may then be repeated.

This is intended as one example of the type of control available from the present invention and to illustrate the ability to use pre-existing control signals and to provide more sophisticated coordination of the vacuum system with the injection-molding machine, and this example is not meant to be limiting.

It is specifically intended that the present invention not be limited to the embodiments and illustrations contained herein, but include modified forms of those embodiments including portions of the embodiments and combinations of elements of different embodiments as come within the scope of the following claims.

I claim:

1. A vacuum system for an injection-molding machine having at least one injector unit, a mold clamp unit, and an injection molding controller producing control signals controlling the injector and mold clamp unit, the vacuum system comprising:
   an interface cable connectable to the control signals of the injection-molding controller;
   a programmable logic controller receiving the control signals from the interface cable and executing a stored program to derive vacuum timing signals from at least some of the control signals; and
   a vacuum pump and valve assembly receiving vacuum timing signals from the programmable logic controller to provide vacuum on a vacuum line to a mold in response to the vacuum timing signals, the vacuum line adapted to connect to a channel on the mold providing a path of gases out of the mold;
   whereby standard injection-molding control signals may be used to control the vacuum system;
   further including at least one electronic timer having an integral programming panel, the electronic timer communicating with the programmable logic controller to provide a timing function for the vacuum timing signal
   further including a housing holding the programmable logic controller and the timer, wherein the integral programming panel of the timer is exposed through a front face of the housing.

2. The vacuum system of claim 1 wherein the programmable logic controller provides the vacuum timing signal to the electronic timer and the electronic timer delays the vacuum timing signal by a predetermined time set on the integral programming panel, and then communicates the vacuum timing signal to the vacuum pump and valve assembly.

3. The vacuum system of claim 1 wherein the timing function is a duration of an application of vacuum to the mold.

4. The vacuum system of claim 1 further including a vacuum pressure regulator held within the housing and having a gauge and dial exposed through a front face of the housing.

5. The vacuum system of claim 1 further including a terminal block receiving the interface cable and providing terminals releasably holding wires communicating with the programmable logic controller and the electronic timer.

6. A vacuum system for an injection-molding machine having at least one injector unit, a mold clamp unit, and an injection-molding controller producing control signals controlling the injector and mold clamp unit, the vacuum system comprising:
   an interface cable connectable to the control signals of the injection-molding controller;
   a programmable logic controller receiving the control signals from the interface cable and executing a stored program to derive vacuum timing signals from at least some of the control signals; and
   a vacuum pump and valve assembly receiving vacuum timing signals from the programmable logic controller to provide vacuum on a vacuum line to a mold in response to the vacuum timing signals;
   an input receiving compressed air and a compressed air valve assembly communicating with the vacuum line,
   wherein the programmable logic controller further executes the stored program to create blowback timing signals from at least some of the control signals to the compressed air valve to provide compressed air on the vacuum line to the mold.

7. The vacuum system of claim 6 further including at least one electronic timer having an integral programming panel, the electronic timer communicating with the programmable logic controller to provide a timing function for the vacuum timing signal.

8. The vacuum system of claim 6 wherein the programmable logic controller further executes the stored program to create a control signal communicated to the injection-molding machine causing the injection-molding controller to pause cycling of the injection-molding machine.

9. The vacuum system of claim 6 further including a pressure sensor and wherein the programmable logic controller further receives a signal from the pressure sensor to create the vacuum timing signal.

10. The vacuum system of claim 6 wherein the control lines of the injection-molding controller are electrical inputs and/or outputs providing standard signals to automatic parts handling machines.

11. The vacuum system of claim 6 wherein the programmable logic controller includes a removable memory and further including multiple removable memories providing stored programs associated with the control signals of different standard injection-molding machines.

12. A vacuum system for an injection-molding machine having at least one injector unit, a mold clamp unit, and an injection molding controller producing control signals controlling the injector and mold clamp unit, the vacuum system comprising:
   an interface cable connectable to the control signals of the injection-molding controller;
   a programmable logic controller receiving the control signals from the interface cable and executing a stored program to derive vacuum timing signals from at least some of the control signals; and
   a vacuum pump and valve assembly receiving vacuum timing signals from the programmable logic controller to provide vacuum on a vacuum line to a mold in response to the vacuum timing signals, the vacuum line adapted to connect to a channel on the mold providing a path of gases out of the mold;

whereby standard injection-molding control signals may be used to control the vacuum system;

wherein the programmable logic controller further executes the stored program to provide a pump control signal to the vacuum pump and valve assembly stopping the pump when vacuum will not be required for a predetermined period of time.

13. A vacuum system for an injection-molding machine having at least one injector unit, a mold clamp unit, and an injection molding controller producing control signals controlling the injector and mold clamp unit, the vacuum system comprising:

an interface cable connectable to the control signals of the injection-molding controller;

a programmable logic controller receiving the control signals from the interface cable and executing a stored program to derive vacuum timing signals from at least some of the control signals; and a vacuum pump and valve assembly receiving vacuum timing signals from the programmable logic controller to provide vacuum on a vacuum line to a mold in response to the vacuum timing signals, the vacuum line adapted to connect to a channel on the mold providing a path of gases out of the mold;

whereby standard injection-molding control signals may be used to control the vacuum system;

further including an input receiving compressed air and a compressed air valve assembly communicating with the vacuum line, wherein the programmable logic controller further executes the stored program to create blowback timing signals from at least some of the control signals to the compressed air valve to provide compressed air on the vacuum line to the mold.

* * * * *